(12) United States Patent
Marr et al.

(10) Patent No.: US 8,374,086 B2
(45) Date of Patent: Feb. 12, 2013

(54) ADAPTIVE DHT NODE RELAY POLICIES

(75) Inventors: James E. Marr, Foster City, CA (US); Payton White, Foster City, CA (US); Howard Berkey, Foster City, CA (US); Attila Vass, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 313 days.

(21) Appl. No.: 11/759,186

(22) Filed: Jun. 6, 2007

(65) Prior Publication Data

US 2008/0304493 A1    Dec. 11, 2008

(51) Int. Cl.
*G01R 31/08* (2006.01)
*H04J 1/16* (2006.01)
*G06F 15/16* (2006.01)

(52) U.S. Cl. .................................. 370/230.1; 709/204
(58) Field of Classification Search ............... 370/230.1; 709/204

See application file for complete search history.

(56) References Cited

U.S. PATENT DOCUMENTS

| | | | | |
|---|---|---|---|---|
| 7,539,504 | B2* | 5/2009 | Ruef et al. .................. 455/508 |
| 2003/0229674 | A1* | 12/2003 | Cabrera et al. .............. 709/207 |
| 2004/0165587 | A1* | 8/2004 | Kiyoto et al. ................ 370/389 |
| 2004/0249972 | A1* | 12/2004 | White et al. ................ 709/243 |
| 2006/0146991 | A1* | 7/2006 | Thompson et al. .......... 379/67.1 |
| 2007/0143442 | A1* | 6/2007 | Zhang et al. ................ 709/217 |
| 2007/0168450 | A1* | 7/2007 | Prajapat et al. ............. 709/207 |
| 2007/0237139 | A1* | 10/2007 | Garcia-Martin et al. ..... 370/389 |
| 2008/0016100 | A1* | 1/2008 | Boni et al. .................. 707/102 |
| 2008/0028211 | A1* | 1/2008 | Tanizawa et al. ............ 713/163 |
| 2008/0070543 | A1* | 3/2008 | Matuszewski et al. .... 455/404.1 |
| 2008/0279161 | A1* | 11/2008 | Stirbu et al. ................ 370/338 |

OTHER PUBLICATIONS

Stoica, Ion. et al., "Chord: A Scalable Peer-to-peer Lookup Protocol for Internet Applications," IEEE/ACM Transactions on Networking, vol. 11, No. 1, pp. 17-32, Feb. 2003.

* cited by examiner

*Primary Examiner* — Ricky Ngo
*Assistant Examiner* — Paul H Masur
(74) *Attorney, Agent, or Firm* — Kilpatrick Townsend & Stockton LLP

(57) ABSTRACT

In a distributed hash table overlay network, messages directed to a message ID are relayed to one or more nodes that have published interest in that message ID. Messages are distributed, processed, and/or cached in accordance with relay policies, which enable a wide variety of different applications. Nodes specify relay policies on a per-node, per-message, and/or per-message ID basis. Relay policies can specify any behavior associated with messages, including: message caching, distribution, and processing as well as migration of relay policies when nodes join or leave the network. Intermediate nodes can perform any arbitrary processing of messages based on relay policies. Intermediate nodes can offload processing to other nodes, either by forwarding messages to a different message ID or by enlisting the help of nodes subscribed to the message ID. Messages can include one or more subfields specifying commands and/or data to be evaluated by the intermediate node.

26 Claims, 11 Drawing Sheets

MIGRATION

ADAPTIVE DHT NODE RELAY POLICIES

BACKGROUND OF THE INVENTION

The invention relates to the field of data networks, and in particular to peer to peer overlay networks. Peer to peer networks are distributed data networks without any centralized hierarchy or organization. Peer to peer data networks provide a robust and flexible means of communicating information between large numbers of computers or other information devices, referred to in general as nodes.

An overlay network is a logical or virtual network organization that is imposed on nodes connected by one or more types of underlying physical network connections. In an overlay network, nodes are connected by virtual or logical links, each of which can correspond with one or more paths in an underlying physical network. Overlay networks are typically implemented in hardware and/or software operating in the application layer or other top-level layer of an OSI network stack or other type of networking protocol.

One class of peer to peer overlay networks is referred to as distributed hash table networks. Distributed hash table overlay networks use a hash function to generate and assign one or more key values to a unique node. The set of all possible key values is referred to as a hash space. Nodes are organized in the hash space according to their assigned key values. The hash function is selected so that nodes are approximately evenly distributed throughout the hash space. Distributed hash table overlay networks are typically highly scalable, often supporting millions of nodes; robust, allowing nodes to join or leave frequently; and efficient, routing a message to a single destination node quickly.

There are numerous different types of distributed hash table overlay networks. One type of peer to peer overlay network is a chord network. The chord overlay network protocol is described in detail in "Chord: A Scalable Peer-to-peer Lookup Protocol for Internet Applications", Ion Stoica, Robert Morris, David Liben-Nowell, David R. Karger, M. Frans Kaashoek, Frank Dabek, Hari Balakrishnan, *IEEE/ACM Transactions on Networking*, Vol. 11, No. 1, pp. 17-32, February 2003.

Distributed hash table networks such as Chord can include a feature to route messages between nodes based on a message ID. Typically, nodes subscribe to a message ID. Once a node has subscribed to a given message, that node can receive any messages addressed to that message id. Additionally, a node can send messages to the message ID. Messages sent to a message ID will be distributed to any other nodes subscribed to that same message ID.

This message routing feature in prior distributed hash table networks distributes messages between nodes without requiring nodes to know the location of the other nodes. In typical implementations, an intermediate node is assigned responsibility for routing messages to all of the nodes subscribing to a message ID. In prior implementations, the intermediate node receives all messages associated with a message ID and resends these messages as they are received to all nodes currently subscribed to the message ID.

This message routing in prior distributed hash table networks is inflexible and does not provide for any caching, processing, or other manipulation of messages in transit between nodes. This limits the potential applications of message routing in distributed hash table networks.

Additionally, this type of message routing does not handle changes in the network gracefully. For example, if additional nodes subscribe to a message ID after other nodes have already exchanged messages, the distributed hash table network cannot automatically synchronize the newly subscribed nodes with data from previously routed messages.

It is therefore desirable for a system and method to provide message routing that enables additional applications and improves the performance of distributed hash table networks. It is also desirable for a system and method to allow applications to specify message routing behavior based on a variety of criteria. It is further desirable for the system and method to allow applications to specify caching, processing, and other manipulations of messages in transit between nodes. It is additionally desirable for the system and method to synchronize nodes with message data automatically according to application requirements upon subscribing to a message ID.

BRIEF SUMMARY OF THE INVENTION

One embodiment in accordance with the present invention relays messages directed to a message ID to one or more nodes that have published interest in that message ID. Messages are distributed, processed, and/or cached in accordance with relay policies, which enable a wide variety of different applications. An embodiment allows nodes to specify relay policies on a per-node, per-message, and/or per-message ID basis.

In general, relay policies can specify any behavior associated with messages, including: 1) the caching of messages by an intermediate node and the subsequent distribution of cached messages; 2) the distribution or transmission of messages from an intermediate node to receiving nodes; 3) the processing of messages by the intermediate node and/or other nodes assisting or substituting for the intermediate node; 4) and the migration of relay policies, cache messages, and other information to new intermediate nodes when nodes join or leave the network.

Intermediate nodes can perform any arbitrary processing of messages based on relay policies, including translation and transcoding of message contents. Intermediate nodes can offload processing to other nodes, either by forwarding messages to a different message ID or by enlisting the help of nodes subscribed to the message ID. In a further embodiment, messages can include one or more subfields specifying commands and/or data to be evaluated by the intermediate node.

Other embodiments will be obvious to one of ordinary skill in the art in light of the description and figures contained herein.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1:
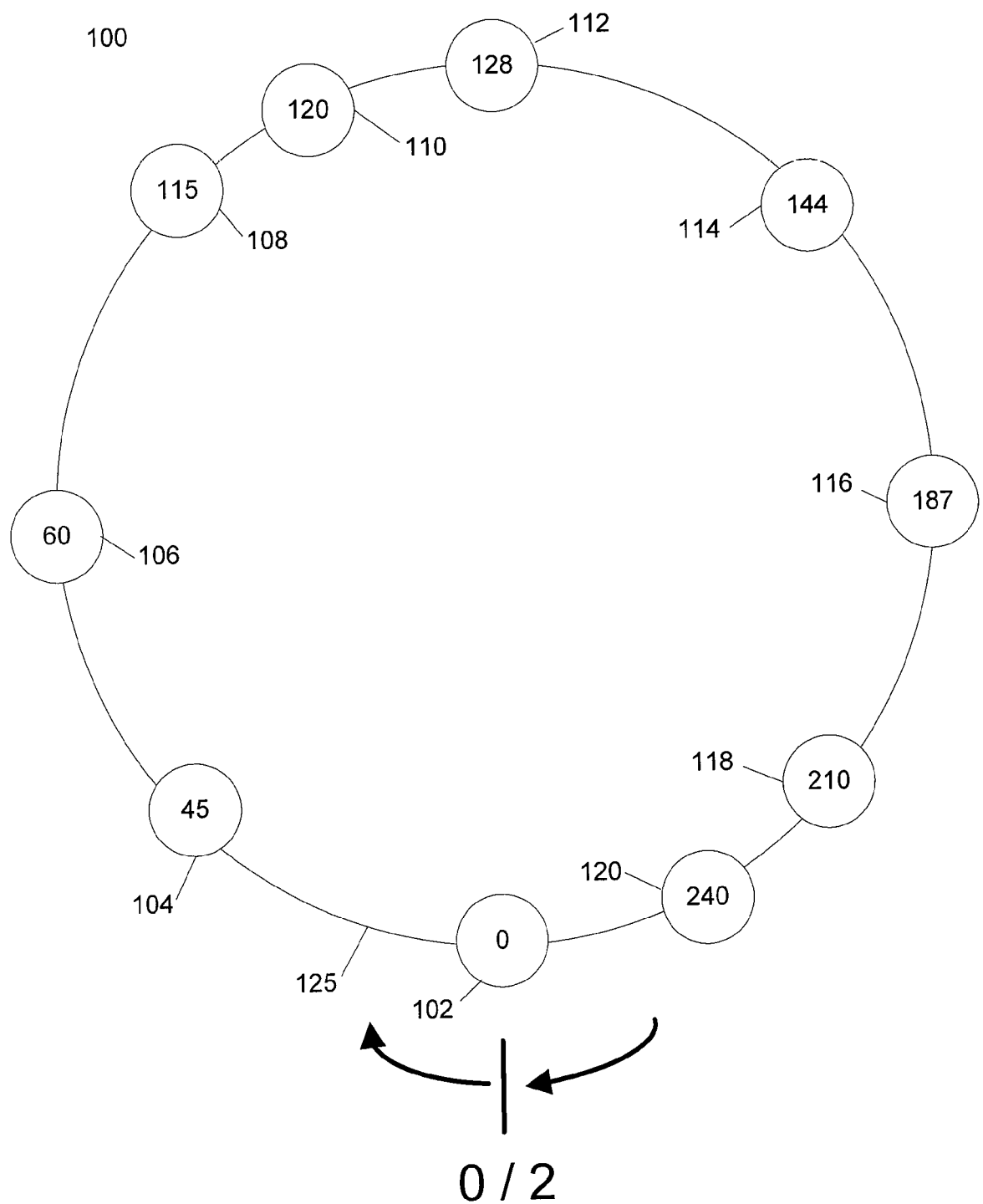
FIG. 1 illustrates an example distributed hash table overlay network according to an embodiment of the invention.

FIG. 1 illustrates an example distributed hash table overlay network 100 according to an embodiment of the invention. The example distributed hash table overlay network 100 includes numerous nodes, such as nodes 102, 104, 106, 108, 110, 112, 114, 116, 118, and 120. Each node is assigned one or more key values. For example, nodes 102, 104, 106, 108, 110, 112, 114, 116, 118, and 120 are assigned key values 0, 45, 60, 115, 120, 128, 144, 187, 210, and 240, respectively.

The nodes of the overlay network are arranged by their assigned key values in the hash space 125, or set of all possible key values. In FIG. 1, the hash space 125 is shown as a ring configuration of all possible key values from 0 to $2^N$, with N being the number of bits allocated for a key value. In some implementations, N equals 160 bits, which is the size of the output of typical hash functions such as SHA-1 and is sufficiently large to avoid hash collisions. In this implementation, the chord overlay network 100 supports up to $2^{160}$ nodes and a typical chord overlay network can include millions of active nodes. Because there are typically many more possible hash values than nodes in the distributed hash table overlay network 100, the hash space 125 may be sparsely populated with nodes, with many hash values between adjacent nodes. Other implementations can use more or less hash bits.

In some implementations, each node is assigned a key value randomly. In some implementations, each node is assigned a key value based upon the results of a hash function of one or more attributes of the node. The hash function is selected so that nodes are approximately evenly distributed throughout the hash space 125. In additional implementations, the assignment of key values to nodes is based at least in part on the topology of the underlying physical network. In these implementations, nodes are distributed approximately evenly throughout the hash space 125; however, the overlay network 100 attempts to ensure that nodes located in close proximity in the physical network are also located in close proximity in the hash space 125 of the overlay network as well.

Based upon the arrangement of nodes in the hash space 125, each node includes a reference to one or more other nodes. In some implementations of a chord overlay network, each node includes a reference to the preceding and succeeding nodes. For example, node 106, with a key value of 60, can include references to nodes 104 and 108, having key values of 45 and 115, respectively. If a new node is added with a key value between that of nodes 106 and 108, such as a key value of 100, the appropriate reference of node 106 will be adjusted accordingly.

In a further implementation, each node includes a finger table including references to one or more nearby or neighboring nodes. Each finger table entry references the node nearest to a key value specified by an offset from the key value of the present node. In some of these implementations, each finger table entry's offset corresponds with a binary place value. For example, a first finger table entry has an offset value of one ($2^0$), a second finger table entry has an offset value of two ($2^1$), a third finger table entry has an offset value of four ($2^2$), a fourth finger table entry has an offset value of eight ($2^3$), and so forth. In other implementations, different offset values can be associated with each finger table entry.

The use of node references and optionally finger tables allows messages to be directed from any node in the overlay network 100 to any other node in the overlay network. The destination node of a message can be specified using the destination node's IP or other network transport layer address or using the destination node's associated key value. Messages may travel from the source node to the destination node directly or may travel to the destination node via one or more intermediate nodes.

In addition to directing messages to specific nodes, an embodiment of the invention includes an adaptive message relay system. The adaptive message relay system allows nodes to subscribe to or "publish" interest in a message ID. Messages sent to a message ID may (or may not) be sent to some or all of the nodes subscribing to that message ID according to one or more relay policies. An intermediate node is assigned responsibility for evaluating relay policies associated with messages and processing messages, caching, and/or forwarding messages to other nodes accordingly.

Each message is associated with one or more relay policies that specify the distribution, processing, caching, migration, and other characteristics for handling messages sent to a message ID. Relay policies can be associated with messages using a variety of different criteria, such as on a per-message ID, per message, per-sending node, per-receiving node, and/or per-intermediate node basis.

Figure 2:
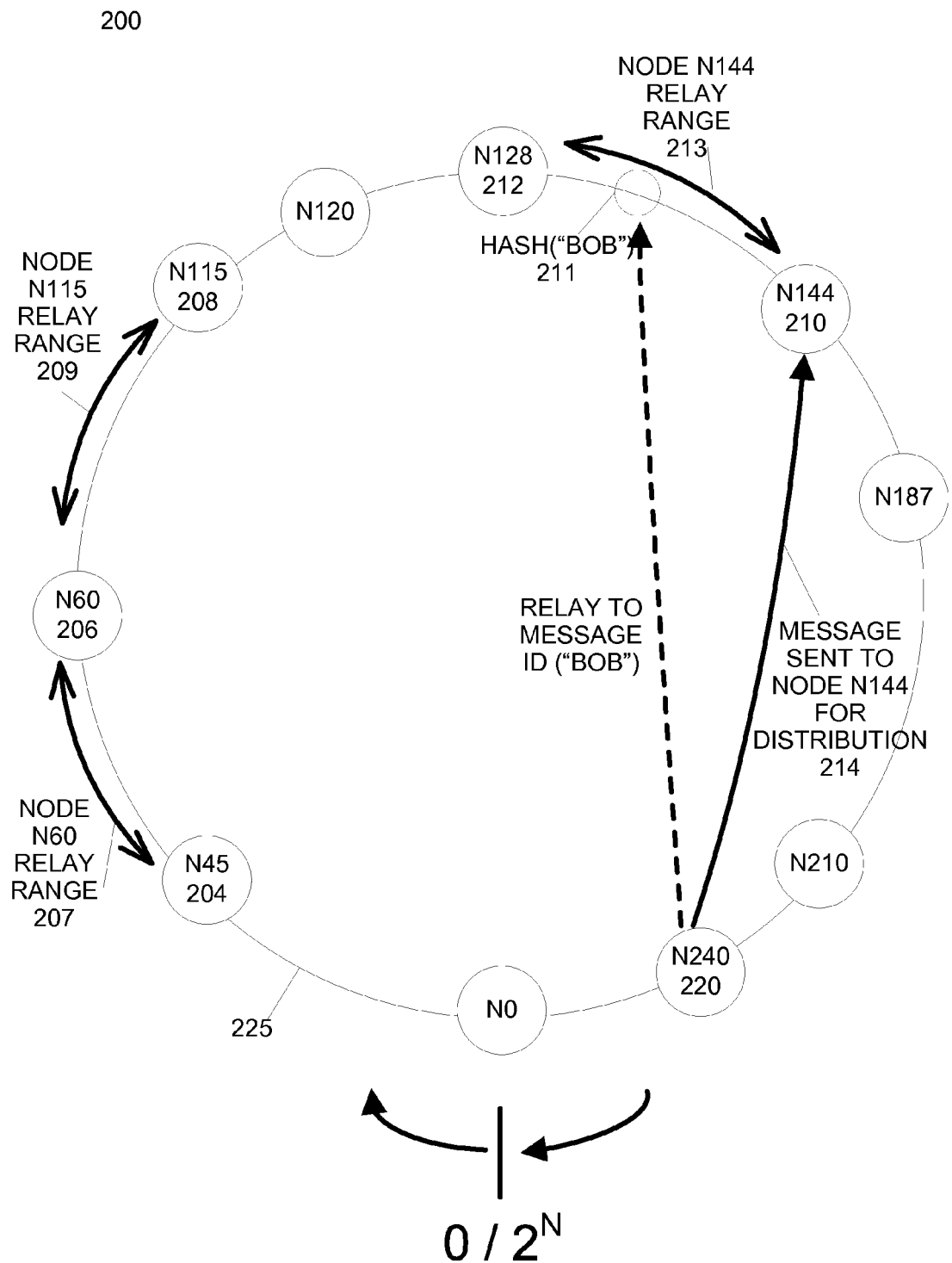
FIG. 2 illustrates an example message relay in a distributed hash table overlay network according to an embodiment of the invention.

FIG. 2 illustrates an example message relay in a distributed hash table overlay network 200 according to an embodiment of the invention. As described above, nodes are assigned key values. Each node's key value defines its location in hash space 225. For example, node N45 204, having a key value of 45, is adjacent to node N60 206, having a key value 60.

Additionally, each node of a distributed hash table network 200 is associated with a range of hash values between itself and an adjacent node in the hash space 225. For example, node N60 206 is associated with the hash values 60 to 46. This range of hash values is referred to as the relay range 207. Similarly, node N15 208, with a key value of 115, has a relay range 209 of hash values from 115 to 61 and node N144 210, with a key value of 144, has a relay range 213 of hash values from 144 to 129. In this example, each node has a relay range of hash values from its own key value down to, but not including, the key value of the preceding adjacent node. In other implementations, relay ranges can be defined differently, such as from the current node's key value up to, but not including, the key value of the following adjacent node.

Messages sent to a hash or key value within a node's relay range will be directed by the distributed hash table overlay network 200 to that node. For example, if node N240 220 wants to send a message directed to a message ID of "BOB," the node will determine a hash value of the message ID "BOB." This hash value of "BOB" is located at location 211 in the hash space 225. The location 211 of the hash value of "BOB" is within the node N144 relay range 213. Thus, node N144 210 is the intermediate node assigned responsibility for distributing messages directed to the message ID "BOB." For example, a message 214 sent to the message ID of "BOB" will be directed to node N144 210. Node N144 210 will evaluate the relay policies associated with message 214 and potentially process and/or distribute message 214 to one or more other nodes that have published interest in the message ID "BOB."

Figure 3:
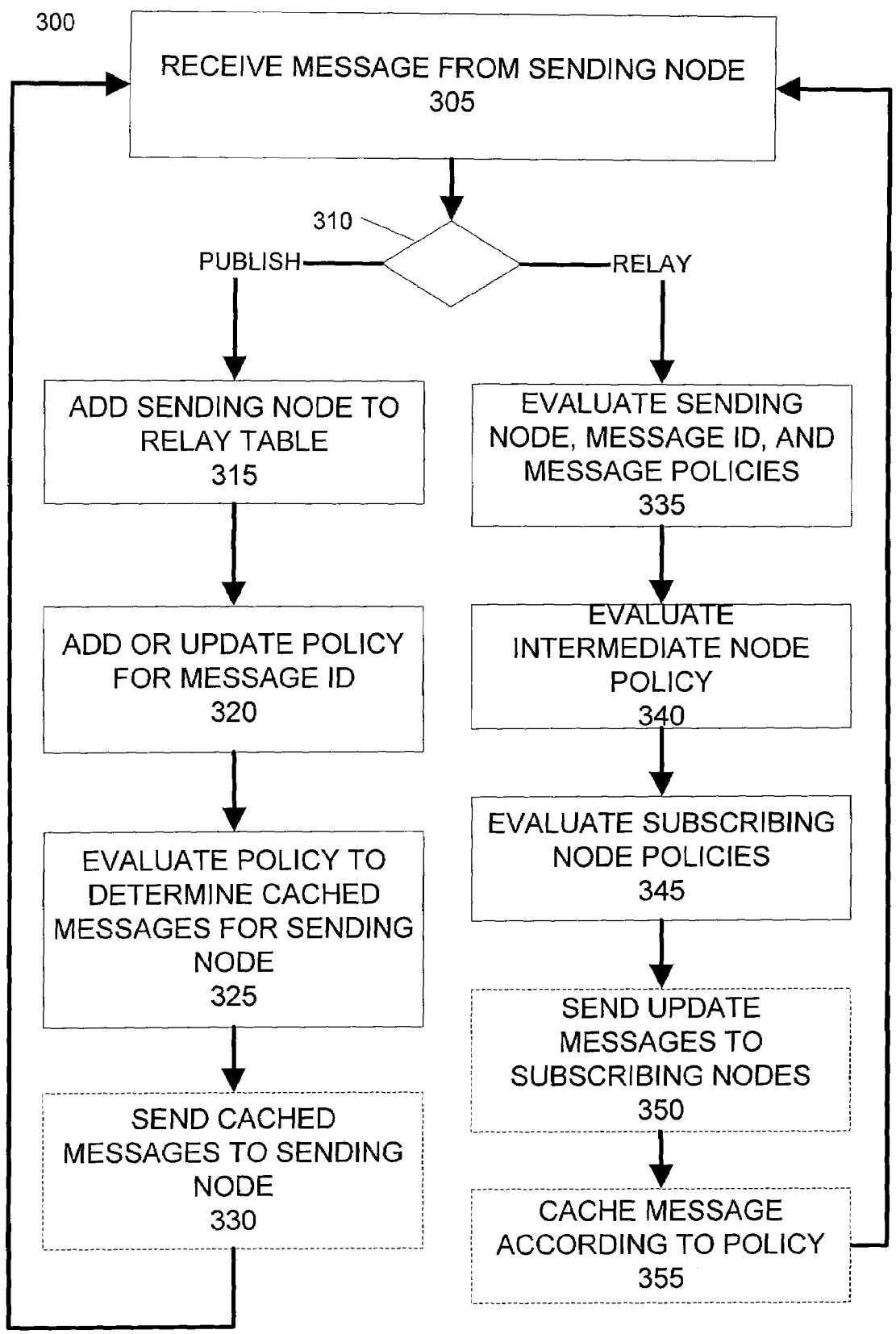
FIG. 3 illustrates a method of relaying messages in a distributed hash table overlay network according to an embodiment of the invention.

FIG. 3 illustrates a method 300 of relaying messages in a distributed hash table overlay network according to an embodiment of the invention. Method 300 begins with step 305, in which a message is received by an intermediate node from a sending node. Decision block 310 determines whether the received message is a publish message used by a sending node to subscribe to a message ID or a relay message used by a sending node to potentially distribute a message to one or more other nodes.

If the received message is a publish message, method 300 proceeds to step 315. In an embodiment, each intermediate node maintains a relay table. Step 315 adds the sending node to a relay table associated with the intermediate node. The relay table stores the identity and/or location of nodes subscribed to one or more message IDs assigned to the intermediate node. In a further embodiment, the relay table stores the relay policies (or references to relay policies) associated with the intermediate node, one or more message IDs, sending nodes, and/or receiving nodes. Examples of relay tables and relay policies are discussed in detail below.

Step 320 adds or updates the relay policies associated with a message ID. In an embodiment, publish messages can include commands, instructions, bytecodes, source code, executable code, and/or data defining one or more policies. If the sending node is the first node to publish an interest in a message ID, then the intermediate node will add the relay policies associated with the message ID, the sending node, and/or any potential receiving nodes to its relay table. If the sending node is not the first node to publish an interested in a message ID, then the intermediate node will add the relay policy associated with the sending node, if any, to the relay table. In further embodiments, a policy included in a received publish or relay message may override a previously specified relay policy for a message, a message ID, a sending node, and/or one or more receiving nodes.

Step 325 evaluates the relay policies to determine if the sending node should receive any cached messages from the intermediate node. In an embodiment, message caching is specified by one or more relay policies associated with a message ID, messages, sending nodes, intermediate nodes, and/or receiving nodes. For example, the intermediate node can cache all of the messages previously sent to a message ID, all of the messages, up to a maximum limit, previously sent to a message ID, the most recent message sent to a message ID, and/or messages of a specific type or including specific content. The type and quantity of messages cached by the intermediate node are specified by relay policies. Additionally, relay policies specify the type and quantity of cached messages, if any, sent to a sending node upon publishing interest in a message ID. Thus, step 325 evaluates these relay policies to determine if any cached messages are to be sent to the sending node.

Optional step 330 sends the cached messages specified by the relay policies back to the sending node. If the relay policies indicate that no cached messages should be sent to the sending node, or if there are no cached messages to send to the sending node, then step 330 may be skipped.

Following step 330, method 300 returns to step 305 to await the receipt of another message from the sending node or any other node.

Returning to decision block 310, if the received message is a relay message, then method 300 proceeds to step 335. Step 335 evaluates the relay policies associated with the received message. These relay policies can include relay policies associated with the message ID, with the received message, and with the sending node.

Step 340 evaluates the relay policies associated with the intermediate node. Step 345 evaluates the relay policies associated with each of the other nodes that have subscribed or published interest in the message ID. Embodiments of method 300 can perform steps 335, 340, and 345 or other permutations thereof in any order. Additionally, some or all of these relay policies may be optional, in which case a default relay policy, such as forwarding the relay message to all subscribing nodes without any additional processing and/or caching, may be applied to the received message in addition to or instead of the relay policies associated with message IDs, messages, sending nodes, receiving nodes, and intermediate nodes.

Following steps 335, 340, and 345, step 350 sends the received message to zero, one, or more of the nodes subscribing to a message ID. The nodes receiving the message are determined from the evaluation of relay policies in steps 335, 340, and 345. The contents and formats of the sent messages can be the same as the received message or be processed, modified, or otherwise changed by the intermediate node in accordance with the relay policies. If the evaluation of the relay policies determines that no subscribing nodes should receive a message, then step 350 may be skipped.

Optional step 355 caches the received message. As discussed above, messages cached by the intermediate node can be provided to additional nodes that later publish an interest in a message ID. Messages are cached in accordance with relay policies associated with the message, message ID, sending node, receiving nodes, and/or intermediate nodes. If the relay policies specify that the received message should not be cached, then step 355 can be skipped. Following step 355, method 300 returns to step 305 to await the receipt of another message from the sending node or any other node.

By enabling nodes to specify relay policies on a per-node, per-message, and/or per-message ID basis, method 300 enables a variety of applications and performance improvements that are unavailable in previous distributed hash table overlay networks.

In general, relay policies can specify any behavior associated with messages, including: 1) the caching of messages by an intermediate node and the subsequent distribution of cached messages; 2) the distribution or transmission of messages from an intermediate node to receiving nodes; 3) the processing of messages by the intermediate node and/or other nodes assisting or substituting for the intermediate node; 4) and the migration of relay policies, cache messages, and other information to new intermediate nodes when nodes join or leave the network.

Figure 4A:
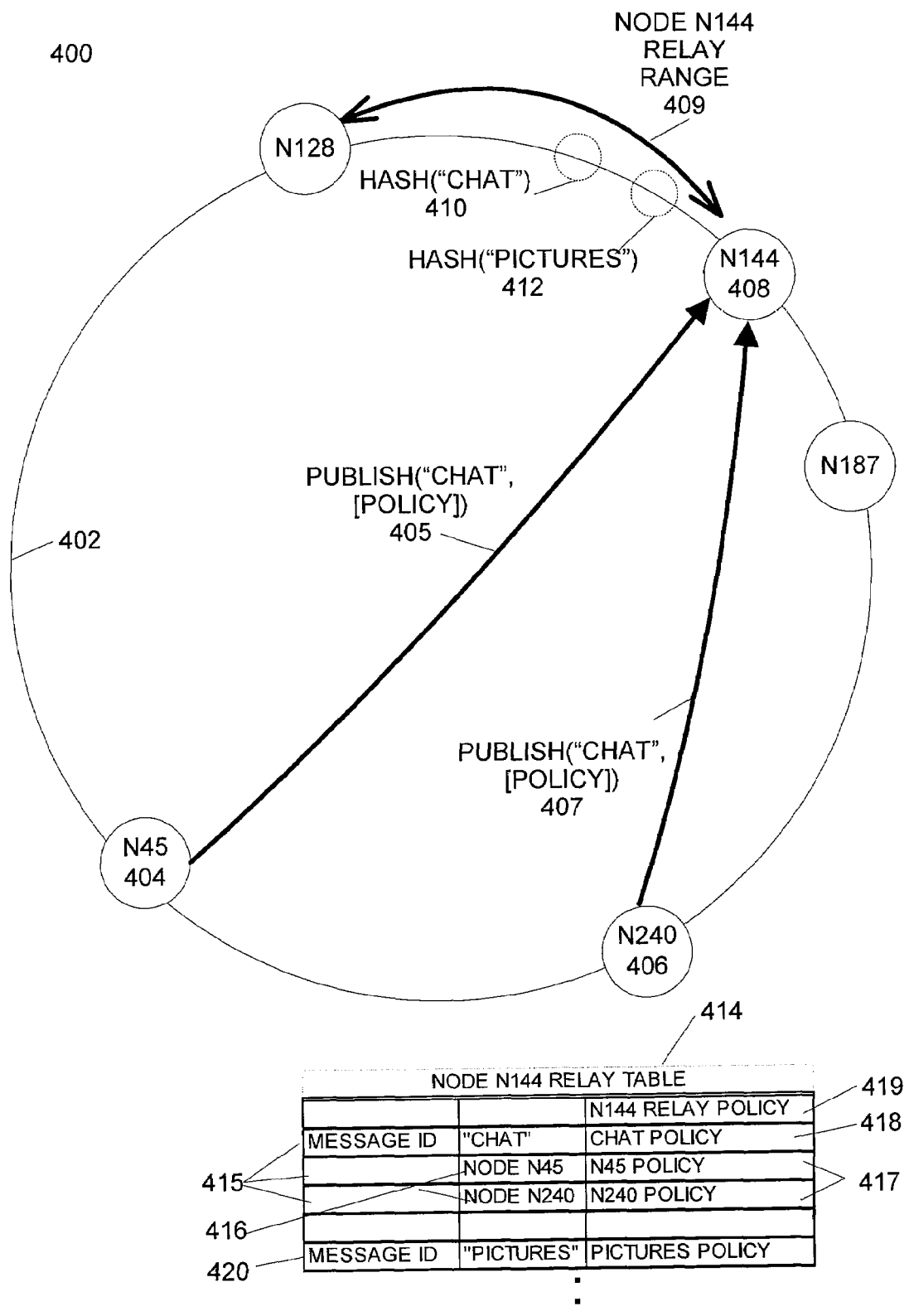
FIGS. 4A-4F are example applications of message relays illustrating embodiments of the invention.

FIGS. 4A-4F are example applications of message relays illustrating embodiments of the invention. FIG. 4A illustrates a first example distributed hash table overlay network 400. Network 400 includes nodes, such as nodes N45 404, N240 406, and N144 408, distributed within a hash space 402. Nodes N45 404 and N240 406 send publish messages 405 and 407 to the message ID "CHAT" to subscribe to messages sent to that message ID. In this example, the hash of the message ID "CHAT" 410 is within the relay range 409 of node N144 408. Thus, the overlay network will direct publish messages 405 and 407 to node N144 408. In this example, node N144 408 serves as the intermediate node for messages with the message ID of "CHAT."

Node N144 408 maintains a relay table 414 to coordinate the processing and distribution of messages sent to message IDs within its relay range 409. Relay table 414 includes a set of entries 415 specifying the nodes subscribing to the message ID "CHAT" 416, the relay policies associated with each subscribing node 417, and the relay policy associated with the message ID "CHAT" 418. Relay table 414 can optionally include further entries for other message ID. For example, if other nodes publish interest in the message ID "PICTURES," and the hash 412 of the message ID "PICTURES" is within the relay range 409, then relay table 414 will include one or more entries 420 for the nodes subscribing to the message ID "PICTURES."

Additionally, the intermediate node N144 408 can have its own relay policies specifying the distribution, processing, and/or caching of messages. The relay policies of intermediate node N144 408 can be specified in an entry 419 of the relay table 414 or elsewhere within the application code or data associated with node N144 408.

Figure 4B:
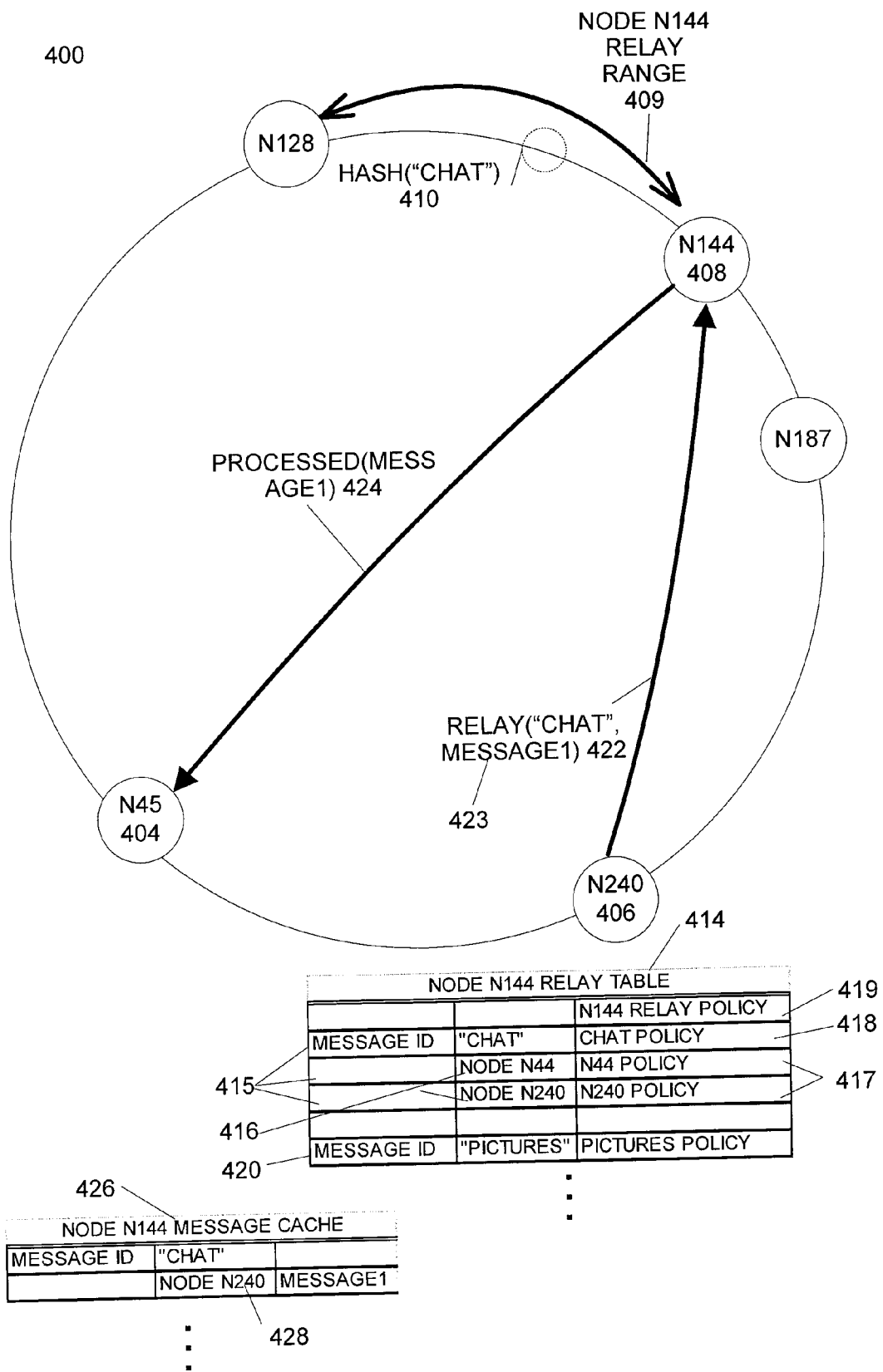

FIG. 4B continues the example of FIG. 4A to illustrate the relaying of an example message in the example distributed hash table overlay network 400. Node N240 406 sends a relay message 422 to the message ID "CHAT." The relay message 422 includes message content "MESSAGE1." In this example, the hash of the message ID "CHAT" 410 is within the relay range 409 of node N144 408. Thus, the overlay network will direct the relay message 422 to node N144 408. In this example, node N144 408 serves as the intermediate node for messages with the message ID of "CHAT."

In general, intermediate nodes can perform any arbitrary type of data processing on messages. The type of processing performed can be specified by relay policies associated with the message ID, the message, the sending node, the receiving nodes, and/or the intermediate nodes. In an embodiment, the relay policies associated with message IDs, messages, the sending node, and receiving nodes are communicated with the intermediate node via all or a portion of a publish or relay message directed to a message ID. The relay policies of the intermediate node can also be specified in this manner or additionally by an application executing on the intermediate node. In a further embodiment, each message's contents includes one or more command and/or data fields specifying relay policies. An intermediate node can parse or evaluate the fields of the message's contents to determine the relay policies applicable to the message ID, message, the sending node, intermediate node, and/or receiving node.

Intermediate node N144 408 will distribute, process, and/or cache relay message according to the relay policies 417, 418, and 419. For example, a relay policy can specify that the intermediate node N144 408 translates the contents of a relay message from one data format to another. Similarly, a relay policy can specify that the intermediate node N144 408 translates the contents from one content type to another, such as from speech to text or vice-versa. In another example, a relay policy can specify that the intermediate node N144 408 translates the contents of a relay message from one language to another language using automated language translation software. This allows would allow users of different nodes to communicate with each other despite language differences.

In still another example, a relay policy can specify that the intermediate node N144 408 transcode audio, video, images, or other multimedia content from one format, resolution, or quality to another. This would allow nodes to exchange audio, video, images, or other multimedia content regardless of each node's capabilities or network connection. For example, a node could send multimedia content in a high quality and high bandwidth format. The intermediate node, based on the relay policies, can transcode this multimedia content to low quality and/or low bandwidth formats based on each subscribing node's capabilities and network connection. The capabilities of each subscribing node can be specified within its relay policy. Furthermore, an intermediate node's relay policy can further modify how messages are processed. For example, if the intermediate node has a large amount of spare processing resources, its relay policy may allow for higher quality (and more processor intensive transcoding). Conversely, if the intermediate node has a small amount of spare processing resources, then its relay policy may specify the use of low quality (and hence less processor intensive transcoding.)

After the message 422 has been processed, in this example, a processed message 424 is sent to node N45 404. Additionally, in this example, the intermediate node stores the message 422 (and/or a processed version thereof, such as message 424 or an alternate processed version), as an entry 428 in message cache 426. Depending upon the relay policies associated with message caching, message cache 426 can store all of the previously sent messages; all of the previously sent messages up to some limit; the most recent message sent to a message ID; and/or messages of a specific type or including specific content.

Figure 4C:
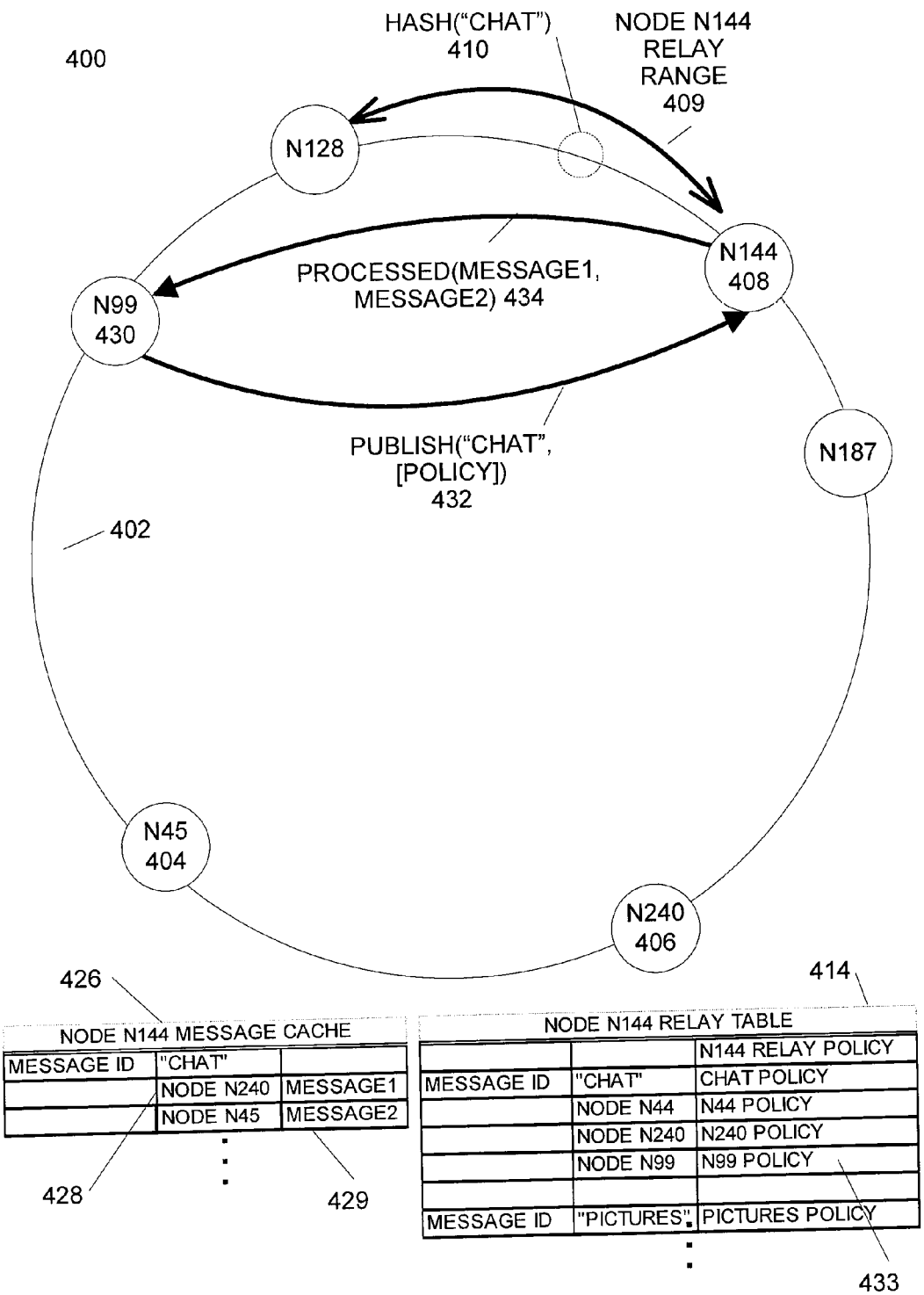

FIG. 4C continues the examples of FIGS. 4A and 4B to illustrate the use of caching messages in the example distributed hash table overlay network 400. In the example of FIG. 4C, an additional node N99 430 has joined the overlay network 400. Node N99 430 sends a publish message 432 to the message ID "CHAT", which is directed by the overlay network 400 to intermediate node N144 408. Message 432 can optionally include a relay policy specifying how messages directed to node N99 430 should be handled by intermediate node N144 408. The intermediate node N144 408 adds an entry 433 to node relay table 414 for node N99 430.

Intermediate node N144 408 then evaluates the policies associated with the message ID "CHAT" to determine if any cached messages should be returned to node N99 430. For example, if the nodes are using message ID "CHAT" to conduct an online meeting, the relay policies may specify that newly joining nodes such as node N99 408 should receive all of the cached messages, so that this node is brought up to date on the previous portions of the meeting. In this example, a return message 434 can include all or a portion of message cache 426 associated with the message ID "CHAT", such as entries 428 and 429.

In another example, if the nodes are using the message ID "CHAT" to indicate online presence, such as whether a node or set of nodes are online and/or available, then only the most recent message associated with a message ID is pertinent. In this example, the return message 434 can include the most recently cached message, such as entry 429 in the message cache.

In either of these two example applications, as well as any other application that includes a return message 434, the return message 434 can include processed versions of one or more cache messages. In an embodiment, an intermediate node can retrieve a cached message from its message cache, process the message according to the relay policies associated with the message ID, message, sending node, intermediate node, and/or the newly joining node.

In still another example, if the messages include real-time information, such as streaming audio and/or video, then older messages may be of little use to a newly joining node. In this example, the message cache 426 may not include any messages associated with the message ID "CHAT" and intermediate node N144 408 may not send out a return message 434.

In some applications, an intermediate node may need to offload some of its message processing on to one or more other nodes. Embodiments of the invention can accomplish this in two different ways. In a first implementation, an intermediate node can republish messages to a different message ID. The republished messages can include commands, instructions, and/or data specifying how to process the republished messages. In an embodiment, these commands, instructions, and/or data are communicated in the form of additional relay policies. The node associated with the different message ID can then process republished messages in accordance with these relay policies.

Figure 4D:
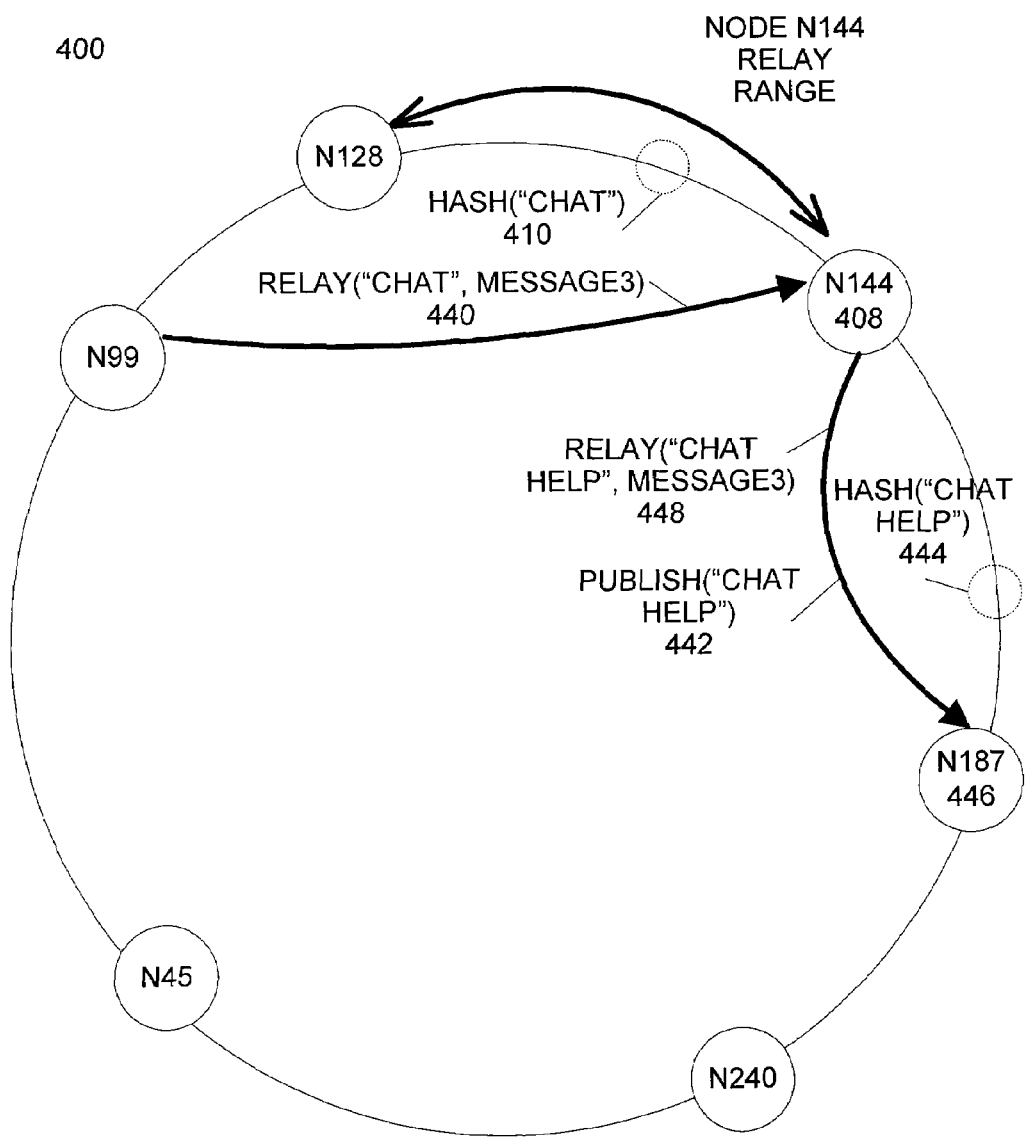

FIG. 4D illustrates an example of this implementation according to an embodiment of the invention. In the example of FIG. 4D, node N99 430 sends a relay message 440 including the content "MESSAGE3" to the message ID "CHAT." As the hash 410 of the message ID "CHAT" is associated with node N144 408, message 440 is directed to this node.

If the intermediate node N144 408 is unable or unwilling to process the message 440 according to the relay policies for some or all of the recipient nodes, then in an embodiment of the invention, intermediate node N 144 408 republishes the message 440 to a different message ID. In this example, node N144 408 first sends a publish message 442 to the message ID of "CHAT HELP". The hash 444 of the message ID "CHAT HELP" is in the relay range of node N187 446 and thus will be directed to node N187 446. In response to the message 442, node N187 446 will prepare to receive one or more messages for processing.

Node N144 408 will then send one or more relay messages 448 including the contents and optionally the relay policies associated with message 440. Each of these relay messages 448 will direct node N187 446 to process the contents of message 440 according to the appropriate relay policies for one or more recipient nodes. Following processing, node N187 446 can return the processed messages back to node N187 408 for forwarding to recipient nodes and/or caching. Alternatively, node N187 446 can forward the processed messages directly to the intended recipient nodes.

In another implementation, an intermediate node can offload some of its message processing on to one or more other nodes by forwarding the message and its contents to one of the recipient nodes. The recipient node can then process the message according to one or more relay policies and forward the result to one or more additional recipient nodes.

Figure 4E:
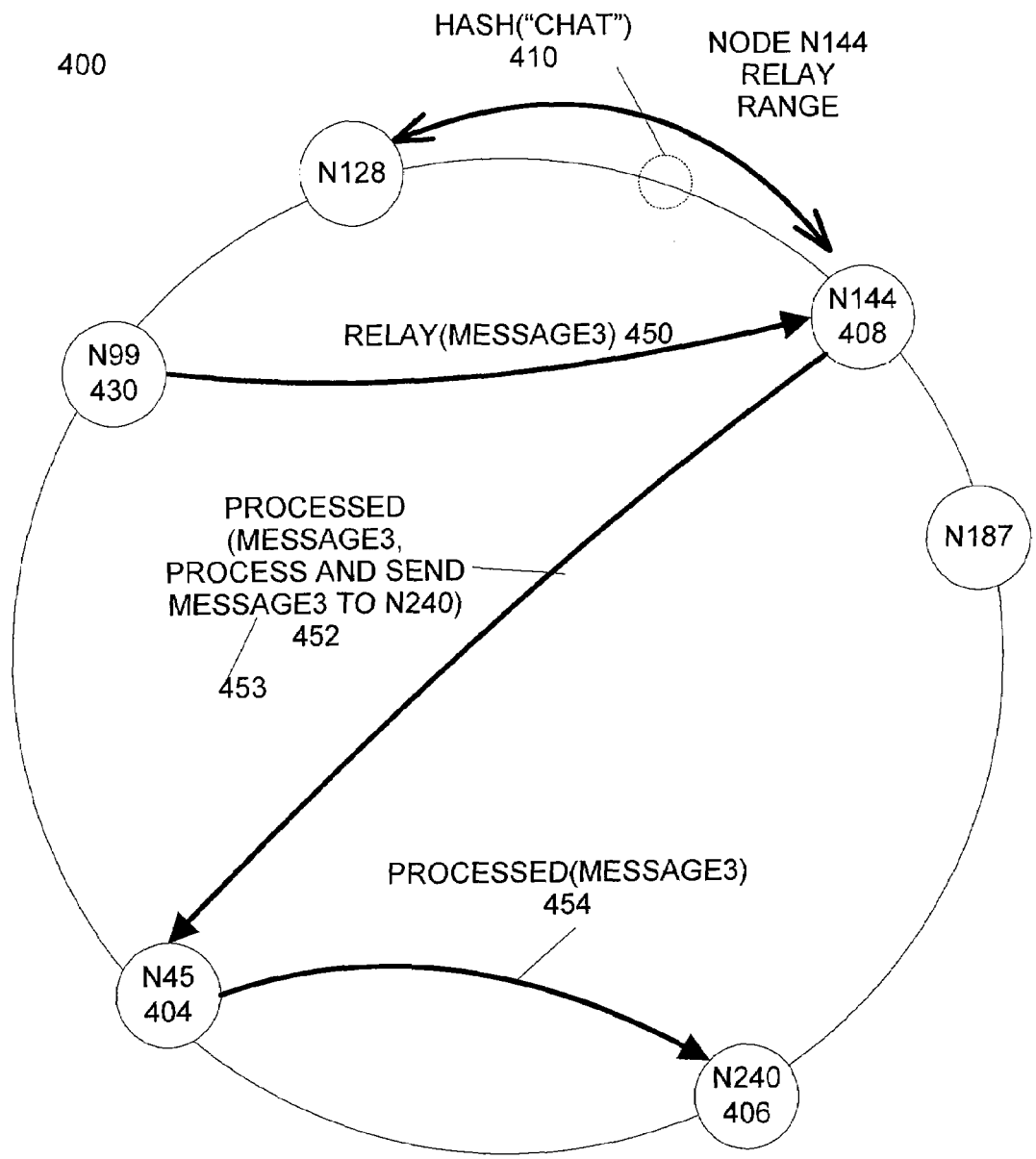

FIG. 4E illustrates an example of this implementation according to an embodiment of the invention. In the example of FIG. 4E, node N99 430 sends a relay message 450 including the content "MESSAGE3" to the message ID "CHAT." As the hash 410 of the message ID "CHAT" is associated with node N144 408, message 450 is directed to this node.

If the intermediate node N144 408 is unable or unwilling to process the message 450 according to the relay policies for some or all of the recipient nodes, then in an embodiment of the invention, intermediate node N144 408 sends a second message 452 to node N45 404. The contents of the second message 452 include the content of message 450, or a processed version thereof. Additionally, the second message 452 can include commands, instructions, and/or data indicating to the node N45 404 that the message contents should be processed according to one or more relay policies and the results forwarded to one or more nodes.

For example, message 452 includes the contents of message 450 and an instruction 453 to process these contents according to a relay policy and forward the result to node N240 406. Node N45 404 will process the contents of message 450 according to the relay policies specified in the instruction 453. Node N45 404 will then forward the result to node N240 406.

When a node joins or leaves the distribute hash table overlay network, the association between relay ranges in the hash space and nodes may change. As a result, a different node may become responsible for handling messages directed to a message ID. To ensure a smooth transition when nodes change responsibilities, migration policies specify the transfer of relay policies and cached messaged between nodes.

Figure 4F:
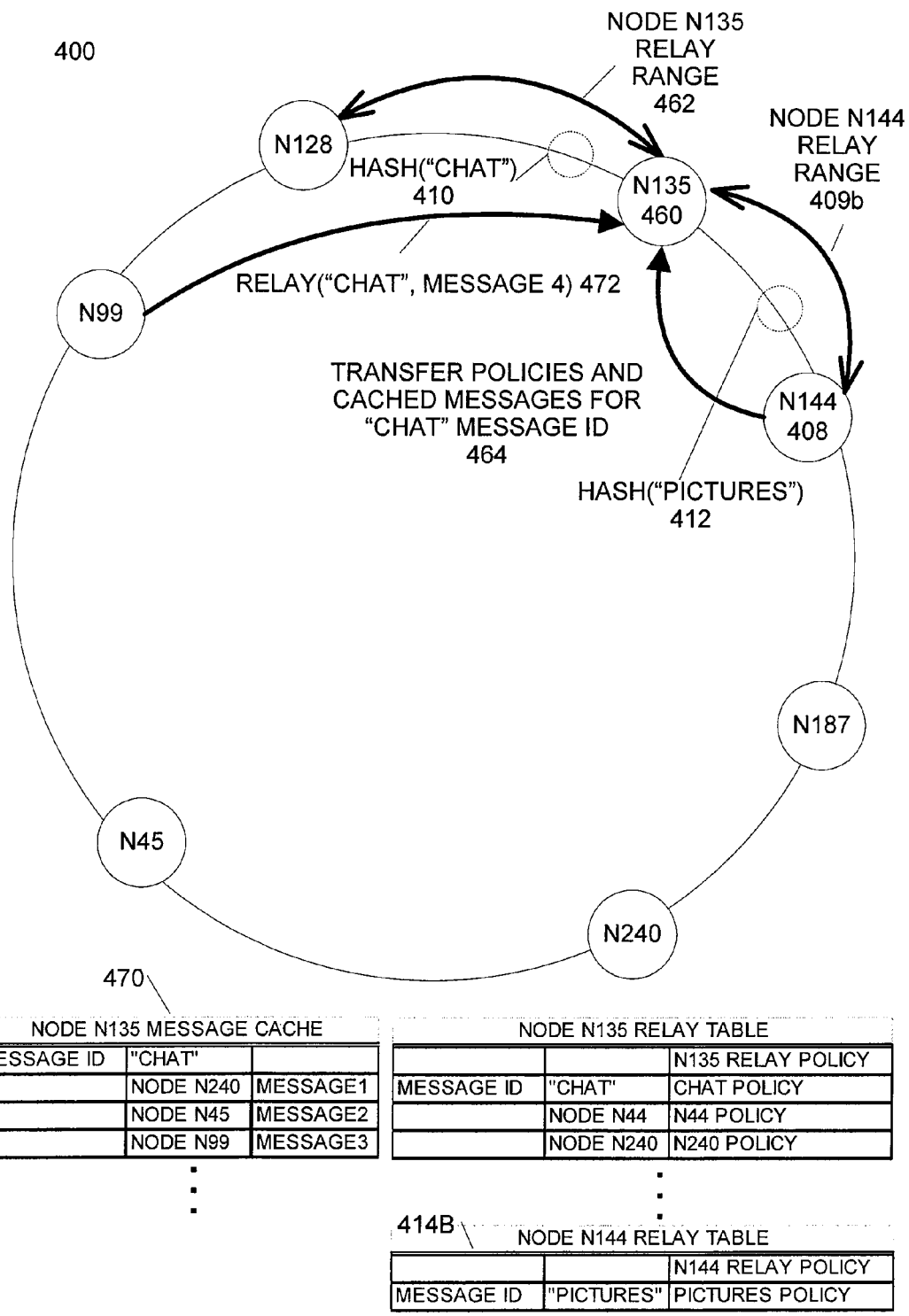

FIG. 4F illustrates an example implementation of migration policies according to an embodiment of the invention. FIG. 4F continues the example distributed hash table overlay network 400 shown in FIGS. 4A-4E. A new node N135 460 joins the overlay network. Because node N135 460 has a key value of 135, it falls within the previous relay range of node N144 408. Thus, node N135 460 assumes control over a portion of the previous relay range of node 144 408. In this example, node N135 460 has a relay range 462 between hash values of 129 and 135 and node N144 408 has a new relay range 409b between hash values 136 and 144.

Because of the change in the relay range 409b of node N144 408, the hash value of the message ID "CHAT" 410 now lies within the relay range 462 of node N135 460, rather than that of node N144 408. Thus, messages directed to the message ID "CHAT" will now be directed to node N135 460. Node N135 460 is now the intermediate node responsible for processing, caching, and/or distributing messages directed to the message ID "CHAT".

To ensure that messages directed to the message ID "CHAT" are handled correctly by the new intermediate node N135 460, an embodiment of the invention includes migration policies specifying how to transfer relay policies and cache messages from one node to another. In an embodiment, the distributed hash table network automatically notifies nodes when they have a new neighboring node. Thus, in this embodiment, node N144 408 will be automatically notified when node N135 460 is added to the network 400.

In response to this notification of a new neighboring node, N144 408 will compare the key value of the new node with the hash values of the message IDs for any relay messages it is responsible for. For example, node N144 408 compares the key value of node N135 460, which is 135, with the hash values of the message IDs "CHAT" 410 and "PICTURES" 412. In this example, the hash value of message ID "CHAT" is less than the key value of 135, indicating that node N135 460 is now responsible for these messages, while the hash value of message ID "PICTURES" 409 remains in the relay range 409b of node N144 408, indicating that messages with the message ID "PICTURES" are still the responsibility of node N144 408.

In response to the change in responsibility for the message ID "CHAT", node N144 408 transfers the relay policies and/or cached messages associated with this message ID, as well as any relay policies associated with nodes sending or receiving messages with this message ID, to the new intermediate node N135 460. In an embodiment, this information is communicated via one or more migration messages 464. Following the receipt and processing of migration messages 464, node N144 408 will have a relay table 414b. Node N135 460 will have a relay table 468 and a message cache 470.

In some cases, a new intermediate node will receive a message, such as message 472, directed to a message ID prior to receiving and/or processing migration messages from the previous intermediate node. In this situation, the new intermediate node will not have the information, such as the subscribing nodes and relay policies, necessary to process, cache, and/or distribute this message. In one embodiment, a node will drop or discard any relay message it receives associated with a message ID that the node does not have complete information for. In another embodiment, the node will temporarily store the message for a short period of time in case the corresponding migration messages for this message ID are on the way.

Figure 5:
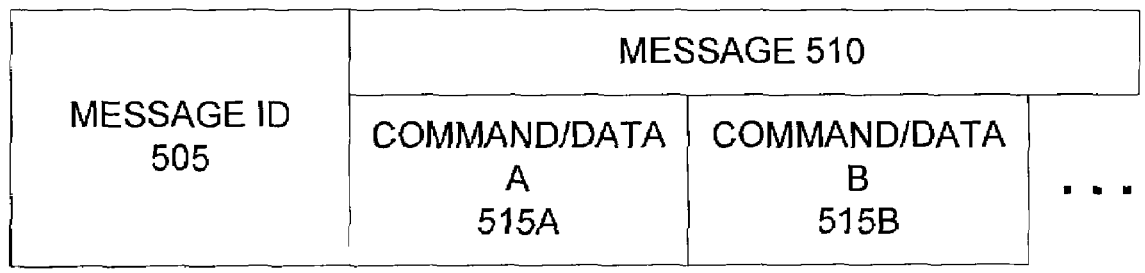
FIG. 5 illustrates an example relay message data structure according to an embodiment of the invention.

FIG. 5 illustrates an example relay message data structure 500 according to an embodiment of the invention. Example relay message data structure 500 includes a message ID field 505 and a message field 510. The message field 510 can include message data or in an embodiment include one or more subfields 515, such as subfields 515A and 515B. Each of the subfields can include a command, an instruction, or data. A node receiving a relay message in the form of data structure 500 can parse and process the subfields 515 of message field 510 to instantiate relay policies.

Figure 6:
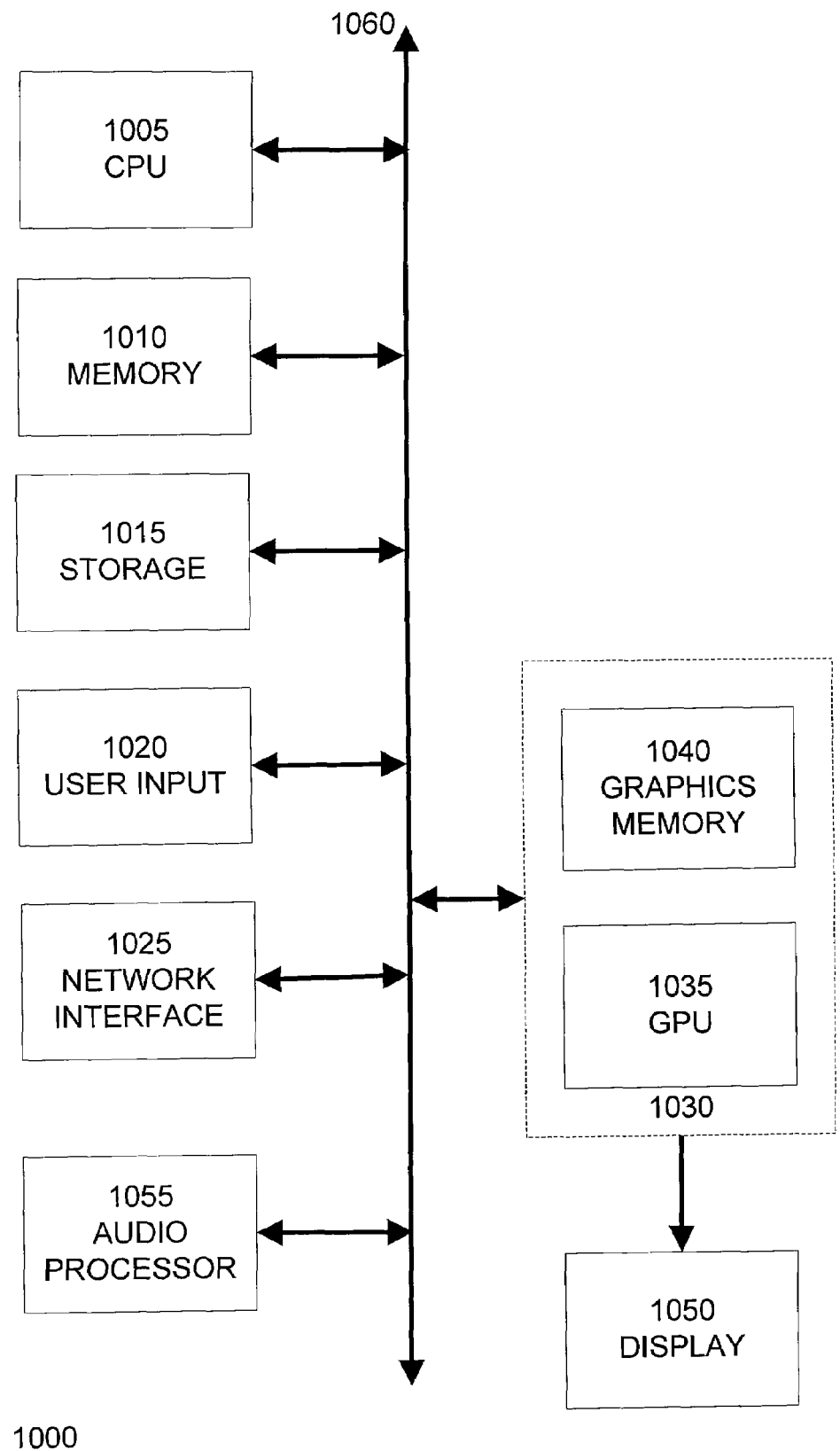
FIG. 6 illustrates an example computer system suitable for use with embodiments of the invention.

FIG. 6 illustrates an example computer system suitable for use with embodiments of the invention. FIG. 6 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more homogeneous or heterogeneous processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of processing messages in an overlay network, the method comprising:
    receiving a message from a first node to a second node, the message being directed by a message ID to the second node;
    determining whether the message indicates an interest by the first node in subscribing to messages associated with the message ID;
    adding the first node to a relay table of the second node based on the determining;
    parsing the message for a first relay policy associated with the first node, and adding the first relay policy to the relay table;
    storing a second relay policy for the second node in the relay table;
    evaluating the first and second relay policies in the relay table;
    processing and sending the message to the first node based on the evaluation of the first and second relay policies in the relay table;
    receiving notification of a third node joining the overlay network;
    in response to a determination that the third node should assume responsibility for the message ID, sending a migration message to the third node, wherein the migration message includes at least one relay policy; and
    wherein the migration message further includes at least one cache message.

2. The method according to claim 1, wherein the first relay policy is previously associated with the first node.

3. The method of claim 1, wherein the first relay policy applies to messages that are at least one of associated with the message ID, sent by the first node, and received by the first node.

4. The method of claim 1, wherein the first relay policy specifies distribution of messages directed to the message ID.

5. The method of claim 1, wherein the first relay policy specifies the processing of messages directed to the message ID by the second node or another node.

6. The method of claim 1, wherein the first relay policy specifies caching of messages directed to the message ID by the second node or another node.

7. The method of claim 1, wherein the first relay policy specifies migration of at least one of relay policy data and cached data from the second node to another node.

8. The method of claim 1, further comprising:
    evaluating a relay policy associated with the message ID to select at least one cached message; and
    sending the selected cached message to the first node.

9. The method of claim 8, wherein the selected message includes the most recently cached message directed to the message ID.

10. The method of claim 8, wherein the selected message includes two or more cached messages directed to the message ID.

11. The method of claim 1, further comprising:
forwarding a relay message to the first node in response to the evaluation of the relay policy.

12. The method of claim 1, further comprising:
evaluating at least one relay policy associated with a received relay message;
processing the received relay message according to the relay policy in response to the evaluating of the at least one relay policy associated with the received relay message; and
forwarding the processed relay message to the first node in response to the evaluating of the at least one relay policy associated with the received relay message.

13. The method of claim 12, wherein processing comprises:
translating at least a portion of the received relay message from a first language to a second language.

14. The method of claim 12, wherein processing comprises:
transcoding at least one of audio and video data included in at least a portion of the received relay message from a first format to a second format.

15. The method of claim 12, wherein processing the received relay message includes:
evaluating a relay policy associated with the second node.

16. The method of claim 12, wherein processing the received relay message includes:
forwarding the received relay message to a second message ID, such that a third node will receive and process the received relay message according to the relay policy.

17. The method of claim 12, wherein processing the received relay message includes:
forwarding the received relay message to a third node, such that the third node will receive and process the received relay message according to the at least one relay policy and forward the processed relay message to the first node.

18. The method of claim 12, wherein the received relay message includes the relay policy.

19. The method of claim 12, wherein evaluating the at least one relay policy includes parsing at least one subfield of the received relay message.

20. The method of claim 19, wherein the subfield includes at least one of a command to be executed by the second node and data adapted to specify the processing of the received relay message by the second node.

21. The method according to claim 1, further comprising:
determining if a third node should assume responsibility for routing messages subscribed to the message ID; and
migrating the first relay policy from the second node to the third node in response to the determination that the third node should assume responsibility for the message ID.

22. A computer program product embedded in a tangible computer readable non-transitory medium for processing messages in an overlay network, comprising:
program code for receiving a message from a first node to a second node, the message being directed by a message ID to the second node;
program code for determining whether the message indicates an interest by the first node in subscribing to messages associated with the message ID;
program code for adding the first node to a relay table of the second node based on the determining;
program code for parsing the message for a first relay policy associated with the first node, and adding the first relay policy to the relay table;
program code for storing a second relay policy for the second node in the relay table;
program code for evaluating the first and second relay policies in the relay table;
program code for processing and sending a message to the first node based on the evaluation of the first and second relay policies in the relay table;
program code for receiving notification of a third node joining the overlay network;
program code for responding to a determination that the third node should assume responsibility for the message ID by sending a migration message to the third node, wherein the migration message includes at least one relay policy; and
wherein the migration message further includes at least one cache message.

23. The product according to claim 22, further comprising:
program code for determining if a third node should assume responsibility for routing messages subscribed to the message ID; and
program code for migrating the first relay policy from the second node to the third node in response to the determination that the third node should assume responsibility for the message ID.

24. The product according to claim 22, wherein the first relay policy is previously associated with the first node.

25. A computerized device for processing messages in an overlay network, the device having a microprocessor, an area of main memory for executing program code under the direction of the microprocessor, and a disk storage device for storing data and program code, the program code including instructions that when executed cause the system to:
receive a message from a first node to a second node, the message being directed by a message ID to the second node;
determine whether the message indicates an interest by the first node in subscribing to messages associated with the message ID;
add the first node to a relay table of the second node based on the determining;
parse the message for a first relay policy associated with the first node, and add the first relay policy to the relay table;
store a second relay policy for the second node in the relay table;
evaluate the first and second relay policies in the relay table;
process and send a message to the first node based on the evaluation of the first and second relay policies in the relay table;
receive notification of a third node joining the overlay network;
in response to the determination that the third node should assume responsibility for the message ID, send a migration message to the third node, wherein the migration message includes at least one relay policy; and
wherein the migration message further includes at least one cache message.

26. The device according to claim 25, wherein the program code further includes instructions that when executed cause the system to:
associate the first node with a first relay policy specified by the message.

* * * * *